United States Patent [19]
Robbins

[11] Patent Number: 4,864,465
[45] Date of Patent: Sep. 5, 1989

[54] VIAD CHIP CAPACITOR AND METHOD FOR MAKING SAME

[75] Inventor: William L. Robbins, Newton, Mass.

[73] Assignee: The United States of America, Washington, D.C.

[21] Appl. No.: 192,098

[22] Filed: May 10, 1988

[51] Int. Cl.⁴ .................. H01G 4/10; H01G 7/00; H05K 1/16
[52] U.S. Cl. ........................... 361/321; 29/25.42; 361/328
[58] Field of Search ............... 29/25.42; 361/328, 329, 361/330, 306, 320, 321

[56] References Cited
U.S. PATENT DOCUMENTS 3,192,086  6/1965  Gyurk .......................... 29/25.42 X
4,349,862  9/1982  Bajorek et al. ................. 361/328 X
4,667,267  5/1987  Hernandez et al. ............. 361/306

OTHER PUBLICATIONS
I.B.M. Technical Disclosure Bulletin, Dec. 7, 1967, vol. 10, No. 7, p. 941.

Primary Examiner—Donald A. Griffin
Attorney, Agent, or Firm—Robert M. Wohlfarth; John P. Tarlano

[57] ABSTRACT

A two pole viad chip capacitor that is activatable from either of its sides having a plurality of ceramic layers in a stack, each and every layer having only two vias, a first via in a first region of each layer and a second via in a second region of each layer; a first conductor in each of the first vias; a second conductor in each of the second vias; a stack of first capacitor plates being on first alternate ceramic layers and each first plate being in electrical contact with a first conductor; and a stack of second capacitor plates, the second plates being on second alternate ceramic layers that are interdigitated with the first alternate ceramic layers and in electrical contact with a second conductor.

6 Claims, 2 Drawing Sheets

VIAD CHIP CAPACITOR AND METHOD FOR MAKING SAME

FIELD OF THE INVENTION

The present invention relates to a viad chip capacitor that has dielectric layers that contain vias. Conductor posts are formed in the vias. The conductor posts make electrical contact with capacitor plates on the layers.

BACKGROUND OF THE INVENTION

Description of Prior Art

U.S. Pat. No. 3,896,354 shows a chip capacitor. The chip capacitor has external electrodes. The electrodes of the capacitor are on the ends of the capacitor. The electrodes are electrically connected to the outer edges of plates of the capacitor.

The viad chip capacitor of the present invention has electrodes that begin on the bottom surface of the capacitor. These electrodes are electrically connected to the plates of the capacitor by means of metalization which is internal of the capacitor. The metalization lies within vias of the capacitor. The vias are internal of the capacitor.

SUMMARY OF THE INVENTION

The present invention relates to a viad chip capacitor. The capacitor has vias passing through it. First and second conductors are in the vias. The conductors make electrical contact with interdigitated first capacitor plates and second capacitor plates. The conductors extend to the outside surfaces of the viad chip capacitor.

The present invention also relates to making a viad chip capacitor.

DESCRIPTION OF THE PREFERRED EMBODIMENTS

Figure 1:
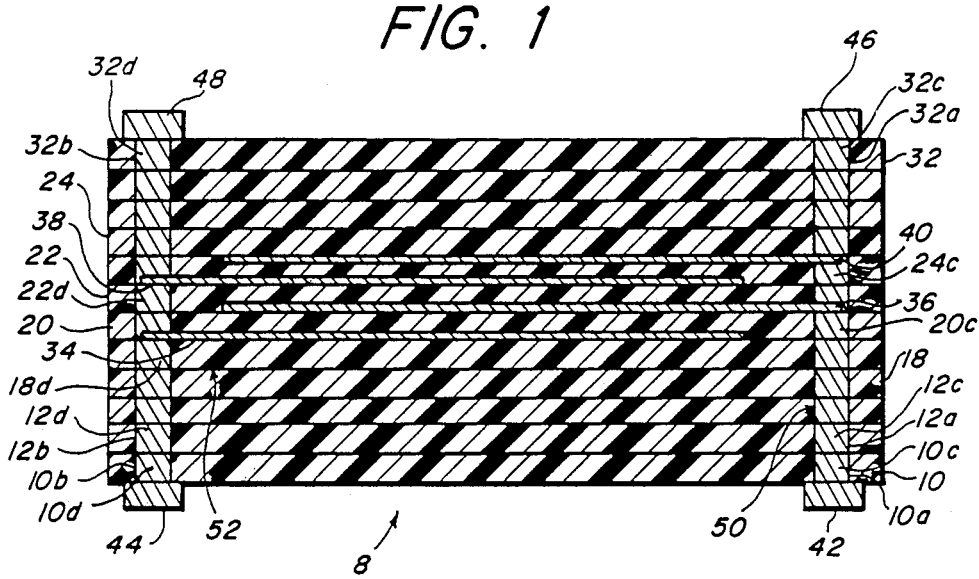
FIG. 1 is a cross-sectional view of an individual viad chip capacitor.

Viad chip capacitor 8 is shown in FIG. 1. Capacitor 8 uses twelve initially unfired ceramic layers 10 to 32. Prior to stacking these layers, vias 10a and 10b are punched in unfired layer 10. Vias 12a and 12b, successively to 32a and 32b, are punched in the other layers respectively. The vias 10a and 10b are spaced 200 mils apart in layer 10. This is true of the vias in the other layers. The vias have a diameter of 20 mils. The thickness of each layer is 3 mils.

The via 10a is filled with conductive material 10c. The via 10b is filed with conductive material 10d. The vias 12a and 12b to 32a and 32b are filled with conductive material 12c and 12d to 32c and 32d, respectively. The conductive material is of a type that is able to withstand a high firing temperature.

Thin precious metal or non-precious metal capacitor plate 34 is formed on layer 18, in electrical contact with conductive material 18d. Similarly thin, precious metal or non-precious metal parallel capacitor plates 36, 38 and 40 are formed on ceramic layers 20, 22 and 24, respectively, in electrical contact with conductive material 20c, 22d and 24c. The metal is able to withstand firing temperatures used after joining the unfired ceramic layers together.

It is noted that the capacitor plate 34 and the conductors 18c and 18d could be placed respectively on and into layer 18 at the same time. Similarly, layers 20, 22 and 24 could be so processed.

Electrodes 42 and 44 are formed on the outer surface of dielectric layer 10. Electrodes 46 and 48 are formed on the outer surface of dielectric layer 32. Metal used to form these electrodes is selected to withstand high firing temperatures.

The processed ceramic layers are then stacked one on top of the other to form a sandwich, such as shown in FIG. 1. The conductive material 10c to 32c will form a first conductor post 50, since this material is merged together in the stack after firing. A similar conductor post 52 is formed from conductor material 10d to 34d. The sandwich is fired at a suitable ceramic firing temperature to form viad chip capacitor 8.

The electrodes 42 and 44 or 46 and 48 are used to allow the viad chip capacitor 8 to be electrically attached to a host circuit board, by solder attachment of the electrodes to the circuit board.

Figure 2:
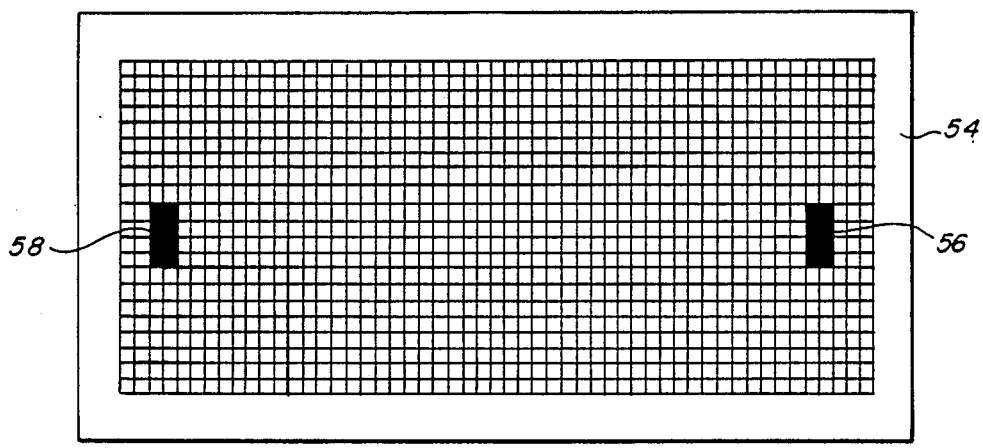
FIG. 2 is a top view of FIG. 1.

The viad chip capacitor 8 of FIG. 1 could alternatively be made by a wet process. In this process electrodes 42 and 44 are first formed on a substrate. The substrate is treated with a material such as teflon so that the electrodes can be lifted from the substrate after the capacitor 8 is formed. A wet ceramic material is screened on the substrate, to form a layer 10, through a screening mask 54 shown in FIG. 2. The vias areas 10a and 10b are formed by means of the solid areas 56 and 58 in screening mask. Thus, differential screening of the wet ceramic material is accomplished with the aid of the screening mask 54. The wet ceramic layer 10 is then allowed to solidify. Conductor material plugs 10c and 10d are formed in the viad areas 10a and 10b.

The screening process is repeated four times until dielectric layers 10, 12, 14, 16, and 18 are built upon the substrate. These layers have conductive material plugs formed in their vias as they are built up.

A capacitor plate 34 is formed on the dielectric layer 18. The capacitor plate 34 lies against the conductive material plug 18d so that there is electrical contact between them. It is noted that the capacitor plate 34 and conductive material plugs 18c and 18d could be formed respectively on and in dielectric layer 18 at the same time.

The remainder of the dielectric layers and capacitor plates of the capacitor 8 of FIG. 1 are similarly deposited to form a sandwich. The electrodes 46 and 48 are then formed on dielectric layer 32. These electrodes are in electrical contact with the conductive material plugs 32c and 32d in dielectric layer 32. The sandwich is then fired to complete the capacitor 8.

Figure 3:
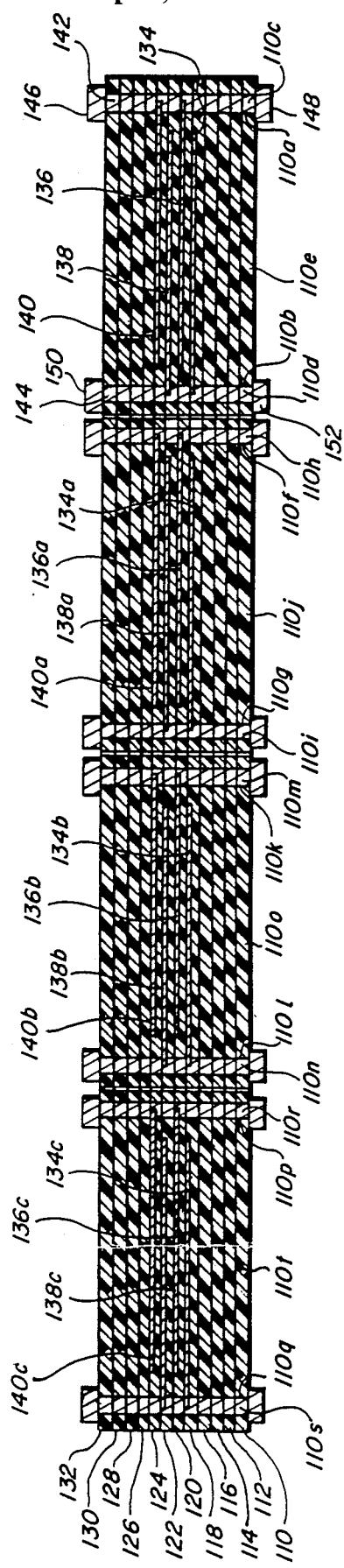
FIG. 3 is a cross-sectional view of joined viad chip capacitors formed from ceramic tapes.

As shown in FIG. 3, twelve tapes 110 to 132 are used instead of using the twelve individual layers 10 and 32 shown in FIG. 1. A first tape 110 has a multiple number of dielectric layers 110e, 110j, 110o and 110t. A second tape 112 also has the same number of dielectric layers. Vias 110a and 110b, 110f and 110g, 110k and 110l, and 110p and 110q are punched in tape 110. Vias are similarly formed in the other tapes.

The vias 110a and 110b in tape 110 are filled with conductive material 110c and 110d. Vias 110f and 110g are filled with conductive material 110h and 110i. Vias 110k and 110l are filled with conductive material 110m and 110n. Vias 110p and 110q are filled with conductive material 110r and 110s. The vias of the other tapes are similarly filled.

Capacitor plates 134, 134a, 134b, and 134c are formed on tape 118 in electrical contact with conductive material 118d, 118i, 118n and 118s. Capacitor plates 136, 136a, 136b and 136c are similarly formed on a tape 120 in electrical contact with conductive material 120c, 120h, 120m and 120r. Capacitor plates 138, 138a, 138b, and 138c are formed on a tape 122 in electrical contact with conductive material 122d, 122i, 122n and 122s. Capacitor plated 140, 140a, 140b, 140c are formed on a tape 124 in electrical contact in the conductive material 124c, 124h, 124m and 124r. The tapes 126, 128, 130 and 132 are then put in place, to form the sandwich 141.

The tapes 110 to 132 are stacked so that the vias line up to form conductor posts, such as conductor posts 142 and 144 Electrodes 146, 148, 150 and 152 are placed in electrical contact at each end of conductor posts 142 and 144. Other electrodes are placed in electrical contact with the other conductor posts. Sandwich 141 is cut into individual chip capacitors similar to the capacitor 8 of FIG. 1. Each individual capacitor is fired to form a capacitor such as capacitor 8 of FIG. 1.

While the present invention has been disclosed in connection with the preferred embodiment thereof, it should be understood that there may be other embodiments which fall within the spirit and scope of the invention as defined by the following claims.

What is claimed is:

1. A two pole viad chip capacitor that is activatable from either of its sides, comprising:
   (a) a plurality of ceramic layers in a stack, each and every layer having only two vias, a first via in a first region of each layer and a second via in a second region of each layer;
   (b) a first conductor in each of the first vias;
   (c) a second conductor in each of the second vias;
   (d) a stack of first capacitor plates, the first plates being on first alternate ceramic layers, each first plate being in electrical contact with a first conductor; and
   (e) a stack of second capacitor plates, the second plates being on second alternate ceramic layers that are interdigitated with the first alternate ceramic layers, each second plate being in electrical contact with a second conductor.

2. The viad chip capacitor of claim 1 wherein an electrode is in electrical contact with each outermost end of the first conductor and wherein an electrode is in electrical contact with each outer most end of the second conductor.

3. A method of making a two pole viad chip capacitor that is activatable from either of its sides, comprising:
   (a) punching each and every one of a plurality of ceramic layers to form only two vias, a first via being formed in a first region of each layer and a second via being formed in a second region of each layer;
   (b) filling the first vias with first conductive material to form a first conductor in each of them;
   (c) filling the second vias with second conductive material to form a second conductor in each of them;
   (d) forming a first capacitor plate on each of selected first ceramic layers in electrical contact with a first conductor;
   (e) forming a second capacitor plate on each of other selected second layers in electrical contact with a second conductor; and
   (f) stacking the selected ceramic layers so that the first capacitor plates alternate with the second capacitor plates and so that the conductors in the first vias make electrical contact among themselves and so that the conductors in the second vias make electrical contact among themselves.

4. The method of claim 3 wherein an electrode is placed in electrical contact with each outermost end of the first conductor and wherein an electrode is in electrical contact with each outermost end of the second conductor.

5. A method of making a viad chip capacitor, comprising the steps of:
   (a) sending ceramic material through a screening mask that has via blocks in it and onto a substrate in order to form a wet ceramic layer having vias in it;
   (b) drying the ceramic layer to form a viad ceramic layer;
   (c) filling the vias of the layer with conductive material to form conductors; and
   (d) forming a capacitor plate on the ceramic layer and in electrical contact with a conductor in the layer.

6. A method of making a viad chip capacitor, comprising the steps of:
   (a) sending ceramic material through a screening mask that has via blocks in it and onto a substrate in order to form a wet first ceramic layer having first vias in it;
   (b) drying the first ceramic layer to form a first viad ceramic layer;
   (c) filling the first vias of the first ceramic layer with conductive material in order to form first and second conductors in the first vias;
   (d) forming a capacitor plate on the first ceramic layer and in electrical contact with the first conductor in the first layer;
   (e) sending ceramic material through the screening mask and onto the first ceramic layer in order to form a wet second ceramic layer having second vias in it, the second vias being in alignment with the first vias;
   (f) drying the second ceramic layer to form a sandwich of ceramic layers;
   (g) filling the second vias of the second ceramic layer with conductive material in order to form first and second conductors in the second vias; and
   (h) forming a capacitor plate on the second ceramic layer and in electrical contact with the second conductor in the second layer.

* * * * *